(12) United States Patent
Ugone (10) Patent No.: US 8,292,122 B2
(45) Date of Patent: Oct. 23, 2012

(54) FLUID CONTAINING AND DISPERSING APPARATUS

(75) Inventor: James Ugone, Topsfield, MA (US)

(73) Assignee: The U-CAN Brand, LLC, Topsfield, MA (US)

( * ) Notice: Subject to any disclaimer, the term of this patent is extended or adjusted under 35 U.S.C. 154(b) by 959 days.

(21) Appl. No.: 12/344,462

(22) Filed: Dec. 27, 2008

(65) Prior Publication Data

US 2010/0163641 A1 Jul. 1, 2010

(51) Int. Cl.
B67D 7/74 (2010.01)
(52) U.S. Cl. ...... 222/129; 222/143; 222/192; 220/23.86
(58) Field of Classification Search .................. 222/192, 222/129, 125, 143, 145.5, 465.1; 220/23.86
See application file for complete search history.

(56) References Cited

U.S. PATENT DOCUMENTS

| | | | |
|---|---|---|---|
| 92,194 A | 7/1869 | Kaiser et al. | |
| 880,522 A | 3/1908 | Gray et al. | |
| 3,353,725 A | 11/1967 | Caceres et al. | |
| 3,648,933 A * | 3/1972 | Grotz | 239/377 |
| 4,030,664 A | 6/1977 | Tisbo et al. | |
| D266,450 S | 10/1982 | Swett et al. | |
| 4,392,594 A | 7/1983 | Swett et al. | |
| 4,726,491 A | 2/1988 | Moon | |
| D295,547 S | 5/1988 | Cunning | |
| 4,901,878 A | 2/1990 | Humphries | |
| 4,993,767 A | 2/1991 | Song | |
| 5,054,656 A * | 10/1991 | Lasner | 222/158 |
| 5,071,034 A | 12/1991 | Corbiere | |
| 5,133,481 A | 7/1992 | Mayfield | |
| 5,271,353 A | 12/1993 | Besthorne | |
| 5,722,570 A | 3/1998 | Swulzer, III et al. | |
| D401,668 S | 11/1998 | Kreizel | |
| 5,881,597 A | 3/1999 | Brooks | |
| 5,975,380 A | 11/1999 | West, Jr. | |
| 6,123,234 A | 9/2000 | Lai | |
| D459,431 S | 6/2002 | Rosenberg | |
| 6,415,956 B1 | 7/2002 | Havlovitz | |
| 6,799,700 B2 | 10/2004 | Durant et al. | |
| D505,182 S | 5/2005 | Durant et al. | |
| 7,011,235 B2 | 3/2006 | Pasquariello | |
| 7,066,358 B2 | 6/2006 | Monsalve et al. | |
| D525,340 S | 7/2006 | Durant | |
| 7,134,577 B1 | 11/2006 | Verma | |
| 7,216,780 B2 | 5/2007 | Durant et al. | |
| 7,315,245 B2 | 1/2008 | Lynn et al. | |
| 7,340,953 B2 | 3/2008 | Green et al. | |
| 2008/0035671 A1 | 2/2008 | Foster | |

* cited by examiner

*Primary Examiner* — Kevin P Shaver
*Assistant Examiner* — Melvin Cartagena
(74) *Attorney, Agent, or Firm* — Lambert & Associates; Gary E. Lambert; David J. Connaughton, Jr.

(57) ABSTRACT

A fluid containing and dispersing apparatus comprising, a primary fluid containing chamber and a secondary mass containing chamber, wherein said primary fluid containing chamber is primarily intended to contain fluids (such as water) and said secondary chamber is primarily intended to contain other matter used as gardening supplements (fertilizers and the like) for plants. The instant invention provides user a means to avoid direct contact with such supplements, which is advantageous as these supplements often comprise chemicals. In one embodiment the invention features a substantially flexible nozzle with removable fluid distribution heads, external chambers for carrying supplies and equipment. Another embodiment comprises an easy to use pump with a fluid measuring display and a time recording feature. Another embodiment features a solid matter containment chamber without said pump apparatus. In the pump embodiment a secondary fluid containment chamber that is contiguously and seamlessly attached to said primary fluid containment chamber.

3 Claims, 6 Drawing Sheets

FLUID CONTAINING AND DISPERSING APPARATUS

This application claims benefit of the filing date of patent application Ser. No. 11/114,874, filing date May 5, 2008.

FIELD OF THE INVENTION

The present invention relates generally to liquid containing and liquid dispersing devices.

BACKGROUND OF INVENTION

Gardeners, botanists, interior landscapers, greenhouse professionals, biology teachers, researchers and others that work with plants depend upon a variety of plant maintenance tools, equipment and supplies. Often these items must be carried by hand which commonly leads to inconvenience and inefficient use of time as most of these items are normally required to be carried separately.

Typically, prior art watering cans provided a means by which users could carry and disperse the fluids contained in the watering can. However, useful fertilizers, chemical, organic, inorganic or otherwise, would have to be premixed with said fluids before carrying away the watering can. This forces users to spend time searching to locate their fertilizers, measuring tools, watering can and numerous other tools, and often forces them to make trips back and forth between locations when not enough can be carried with them on a single trip. Proper use of the prior variant is impossible when the fertilizer is held in containers so voluminous as to make physically carrying them impracticable or even impossible. Additionally, the former variant is wasteful, causing a great loss of time by forcing users to make back and forth trips.

A user could reasonably transfer enough of the fertilizer into a second container in order to carry both that container and the watering can and then perform mixing operations by using portions of fertilizer from the second container, thus avoiding the need to make wasteful trips back and forth for fertilizer. However, as a result, the user's hands are now occupied holding a second container making it awkward if not impossible to carry other useful items (a garden hose for instance).

Later prior art developed incorporating the use of separate chambers within watering cans to store liquid fertilizer. This allowed for the transporting of liquid fertilizers with the watering can, avoiding the need for a second container for transporting fertilizer, thus again freeing the user's hand to carry other containers and useful objects. However, these prior art inventions failed to place separate chambers in efficient and/or convenient locations.

Another limitation of prior art watering cans exists where the nozzles used are commonly comprised of rigid materials that do not bend. This is undesirable in situations when trying to disperse liquid at high and hard to reach areas. Other attempts at providing flexible nozzles are little more then rubber tubes that lack the rigidity to be used practically without support to hold the nozzles in place.

Further, the prior art does not provide users with additional pouches, storage means or other tool carrying means, as part of the single watering can unit, forcing users to rely on multiple trips for tools and/or to carry their tools by other means.

Also, the prior art does not provide a convenient means to mark the instances of unit use.

Additionally, no prior art combines features in one watering can unit to overcome all these shortcomings found in the art.

What is needed is a light weight, portable, accessory-tool carrying watering can and storage apparatus that comprises a separate liquid or solid fertilizer storage chamber that is efficiently and conveniently located with a directionally adjustable, yet ridged, nozzle. The present invention provides a solution to all these shortcomings.

SUMMARY OF THE INVENTION

The instant invention, as illustrated herein, is clearly not anticipated, rendered obvious, or even present in any of the prior art mechanisms, either alone or in any combination thereof. A lightweight, portable, accessory-tool carrying watering can apparatus with a separate fertilizer chamber with separately usable lid, wherein one embodiment of a lid comprises a directionally adjustable nozzle. Thus, the several embodiments of the instant invention are illustrated herein.

Therefore, it is an object of the present invention to overcome the previously mentioned shortcomings found in the prior art with an improved liquid containing and dispersing apparatus.

Another object of the present invention is to provide an improved liquid containing and dispersing apparatus that provides a flexible nozzle.

Another object of the present invention is to provide an improved liquid containing and dispersing apparatus that provides a compactable nozzle.

Another object of the present invention is to provide an improved liquid containing and dispersing apparatus that provides a self-supporting nozzle.

Another object of the present invention is to provide an improved liquid containing and dispersing apparatus that provides a secondary liquid storage chamber.

Another object of the present invention is to provide an improved liquid containing and dispersing apparatus that provides a secondary solid mass storage chamber.

Another object of the present invention is to provide an improved liquid containing and dispersing apparatus that provides a secondary liquid or solid mass storage chamber.

Another object of the present invention is to provide an improved liquid containing and dispersing apparatus that provides a secondary liquid storage chamber near a primary liquid storage chamber.

Another object of the present invention is to provide an improved liquid containing and dispersing apparatus that provides a secondary solid mass storage chamber near a primary liquid storage chamber.

Another object of the present invention is to provide an improved liquid containing and dispersing apparatus that further provides a liquid excision pump within said secondary liquid storage chamber.

Another object of the present invention is to provide an improved liquid containing and dispersing apparatus that provides a measurement means, wherein said measurement means allows for the measurement of the fluids removed from said secondary chamber by said pump during a given usage session.

Another object of the present invention is to provide an improved liquid containing and dispersing apparatus that provides a measurement means, wherein said measurement means allows for the measurement of the fluids held in the primary fluid storage chamber.

Another object of the present invention is to provide an improved liquid containing and dispersing apparatus that is compatible for storing premeasured units of fertilizer.

Another object of the present invention is to provide an improved liquid containing and dispersing apparatus that is compatible for storing premeasured units of fertilizer, wherein said premeasured units of fertilizer are contained within premade storage packets.

Another object of the present invention is to provide an improved liquid containing and dispersing apparatus that is compatible for storing premeasured units of fertilizer, wherein said premeasured units of fertilizer are substantially in tabular form.

Another object of the present invention is to provide an improved liquid containing and dispersing apparatus that provides a measurement means, wherein said measurement means allows for the measurement of solid mass to be removed from said secondary solid mass storage chamber by a solid mass extrusion means.

Another object of the present invention is to provide an improved liquid containing and dispersing apparatus that provides a plurality of apparatus-tool containing pockets about said apparatus.

Another object of the present invention is to provide an improved liquid containing and dispersing apparatus that provides a plurality of apparatus-tool containing pockets about said apparatus, wherein said pockets further comprise at least one drainage cavity.

Another object of the present invention is to provide an improved liquid containing and dispersing apparatus that provides a chamber designed to carry work surface cushioning materials.

Another object of the present invention is to provide an improved liquid containing and dispersing apparatus that provides at least one comfortable-to-hold top gripping and carrying member.

Another object of the present invention is to provide an improved liquid containing and dispersing apparatus that provides at least one comfortable-to-hold side gripping and carrying member.

Another object of the present invention is to provide an improved liquid containing and dispersing apparatus that provides at least one comfortable-to-hold top gripping member and at least one comfortable to hold side carrying member.

Another object of the present invention is to provide an improved liquid containing and dispersing apparatus that provides a convenient means to carry gloves in a 'glove jam', wherein said glove jam comprises two protruding members substantially located opposite to one another wherein the space between these members and other components of the present invention creates a space sufficient in which two gloves may be forced through/into and then held in place by the friction between the gloves, the protruding members and the other components of the present invention.

Another object of the present invention is to provide an improved liquid containing and dispersing apparatus that provides a removable water dispersion member.

Another object of the present invention is to provide an improved liquid containing and dispersing apparatus that provides a convenient means to mark the instances of use of the apparatus, in which the apparatus dispersed liquid and/or applied fertilizer.

Another object of the present invention is to provide an improved liquid containing and dispersing apparatus that provides a convenient means to mark the time of last use of the apparatus to disperse liquid, wherein said convenient means to mark the instances of use of the apparatus to disperse liquid and/or apply fertilizer and wherein, said convenient means to mark the instances of use is in contact with a liquid pump dispersing means.

Another object of the present invention is to provide an improved liquid containing and dispersing apparatus that provides a convenient means to mark the time of the last removal of solid matter, such as chemical, organic and other fertilizers disperse liquid, from a secondary matter storage chamber, wherein said convenient means to mark the time of last solid matter, such as chemical, organic and other fertilizers disperse liquid, from a secondary matter storage chamber is in contact about the outside rim of said secondary matter storage chamber.

Another object of the present invention is to provide an improved liquid containing and dispersing apparatus that provides a convenient means to mark the last occurrence of the action of removing solid mass from the solid mass storage container.

Another object of the present invention is to provide an improved liquid containing and dispersing apparatus that provides an easy-to-use pump, wherein an amount of liquid is removed from a liquid containment chamber, wherein said chamber comprises a part of the device, is determined by observation of the change in the liquid level indicated on a measuring means.

Another object of the present invention is to provide an improved liquid containing and dispersing apparatus that provides an easy-to-use pump, wherein the amount of liquid removed from a single pump is not a predetermined set amount.

Another object of the present invention is to provide an improved liquid containing and dispersing apparatus that provides a substantially non-transparent outer surface, wherein said substantially non-transparent outer surface does not allow those viewing the apparatus to substantially view the contents inside said apparatus by looking through said apparatus.

Another object of the present invention is to provide an improved liquid containing and dispersing apparatus that provides a substantially transparent outer surface, which allows those viewing the apparatus to view the contents inside said apparatus.

Another object of the present invention is to provide an improved liquid containing and dispersing apparatus that provides an outer surface with at least one substantially transparent section, which allows those viewing the apparatus to view the contents inside said apparatus.

Another object of the present invention is to provide an improved liquid containing and dispersing apparatus that provides a nozzle capable of accommodating various nozzle heads.

Another object of the present invention is to provide an improved liquid containing and dispersing apparatus that provides a substantially tubular top and side handle.

Another object of the present invention is to provide an improved liquid containing and dispersing apparatus that provides a substantially tubular swiveling top handle.

Another object of the present invention is to provide an improved liquid containing and dispersing apparatus that provides a substantially tubular left-right swiveling top handle.

Another object of the present invention is to provide an improved liquid containing and dispersing apparatus that provides a substantially tubular pivoting top handle.

Another object of the present invention is to provide an improved liquid containing and dispersing apparatus that provides a substantially tubular left-right pivoting top handle.

Another object of the present invention is to provide an improved liquid containing and dispersing apparatus that provides a secondary fluid retaining and dispersing member, wherein said secondary fluid retaining and dispersing member is attached to a primary fluid retaining and dispersing member.

Another object of the present invention is to provide an improved liquid containing and dispersing apparatus that provides a usage event recording means, such as a calendar-dial, wherein said usage event is the dispersing of fertilizer from a secondary liquid storage chamber or a primary storage chamber.

Another object of the present invention is to provide an improved liquid containing and dispersing apparatus that provides a usage event recording means, such as a side mounted calendar-dial wherein said usage event is the dispersing of fertilizer from a secondary liquid storage chamber or a primary storage chamber.

Another object of the present invention is to provide an improved liquid containing and dispersing apparatus that provides a removably attached mass measuring tube.

Another object of the present invention is to provide an improved liquid containing and dispersing apparatus that provides a removably attached mass measuring tube, wherein said measuring tube comprises a substantially internally threaded top section.

Another object of the present invention is to provide an improved liquid containing and dispersing apparatus that provides a removably attached mass measuring tube, wherein said measuring tube comprises a substantially externally threaded top section.

Another object of the present invention is to provide an improved liquid containing and dispersing apparatus that provides a removably attached mass measuring tube, wherein said measuring tube comprises a substantially externally and internally threaded top section.

Another object of the present invention is to provide an improved liquid containing and dispersing apparatus that provides a removably attached mass measuring implement comprising a substantially shallow cavity at one end and an attached threaded lid at a second end.

Another object of the present invention is to provide an improved liquid containing and dispersing apparatus that provides a removably attached mass measuring implement comprising a substantially shallow cavity at one end and an attached threaded lid at a second end, wherein said removably attached mass measuring implement removably rests within a mass measuring tube.

Another object of the present invention is to provide an improved liquid containing and dispersing apparatus that provides a water passage member that is permanently and contiguously attached to the primary liquid storage chamber.

Another object of the present invention is to provide an improved liquid containing and dispersing apparatus that provides a water passage member that is permanently and contiguously attached to the primary liquid storage chamber at one end, substantially bellowed at a second end.

Another object of the present invention is to provide an improved liquid containing and dispersing apparatus that provides a water passage member that is permanently and contiguously attached to the primary liquid storage chamber at one end and is threaded at a second end.

Another object of the present invention is to provide an improved liquid containing and dispersing apparatus that provides a water passage member that is permanently and contiguously attached to the primary liquid storage chamber at one end, is substantially bellowed at a second end and is threaded at said second end.

Another object of the present invention is to provide an improved liquid containing and dispersing apparatus that provides a removably attached water dispersing head member.

Another object of the present invention is to provide an improved liquid containing and dispersing apparatus that provides a removably attached water dispersing head member, wherein said removably attached water dispersing head member removably attaches to a water passage member.

Another object of the present invention is to provide an improved liquid containing and dispersing apparatus that provides a removably attached water dispersing head member, wherein said removably attached water dispersing head member removably attaches to a water passage member at a threaded end of said water passage member.

Another object of the present invention is to provide an improved liquid containing and dispersing apparatus that provides a head docking member.

Another object of the present invention is to provide an improved liquid containing and dispersing apparatus that provides a threaded head docking member.

Another object of the present invention is to provide an improved liquid containing and dispersing apparatus that provides a removably attached water dispersing head member, wherein said removably attached water dispersing head member removably attaches to a water passage member at a threaded end of said water passage member or removably attaches to a threaded head docking member.

These together with other objects of the invention, along with various features of novelty which characterize the invention, are pointed out with particularity in the claims, Detailed Description of the Embodiments Sections and drawings of this application, with all said sections adding to this disclosure.

DETAILED DESCRIPTION OF THE DISCLOSED EMBODIMENTS

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention, such as portable liquid containing and dispersing apparatuses that have various sizes, dimensions and comprised of various materials.

The present invention solves all the shortcomings found in the prior art by introducing a portable liquid containing and dispersing apparatus that comprises primary and secondary liquid containing chambers, wherein said primary chamber's function is to contain water or a mixture of water and other matter. The secondary liquid containing chamber's chief function is to contain other types of liquid matter (generally intended for containing liquid fertilizers).

Figure 1:
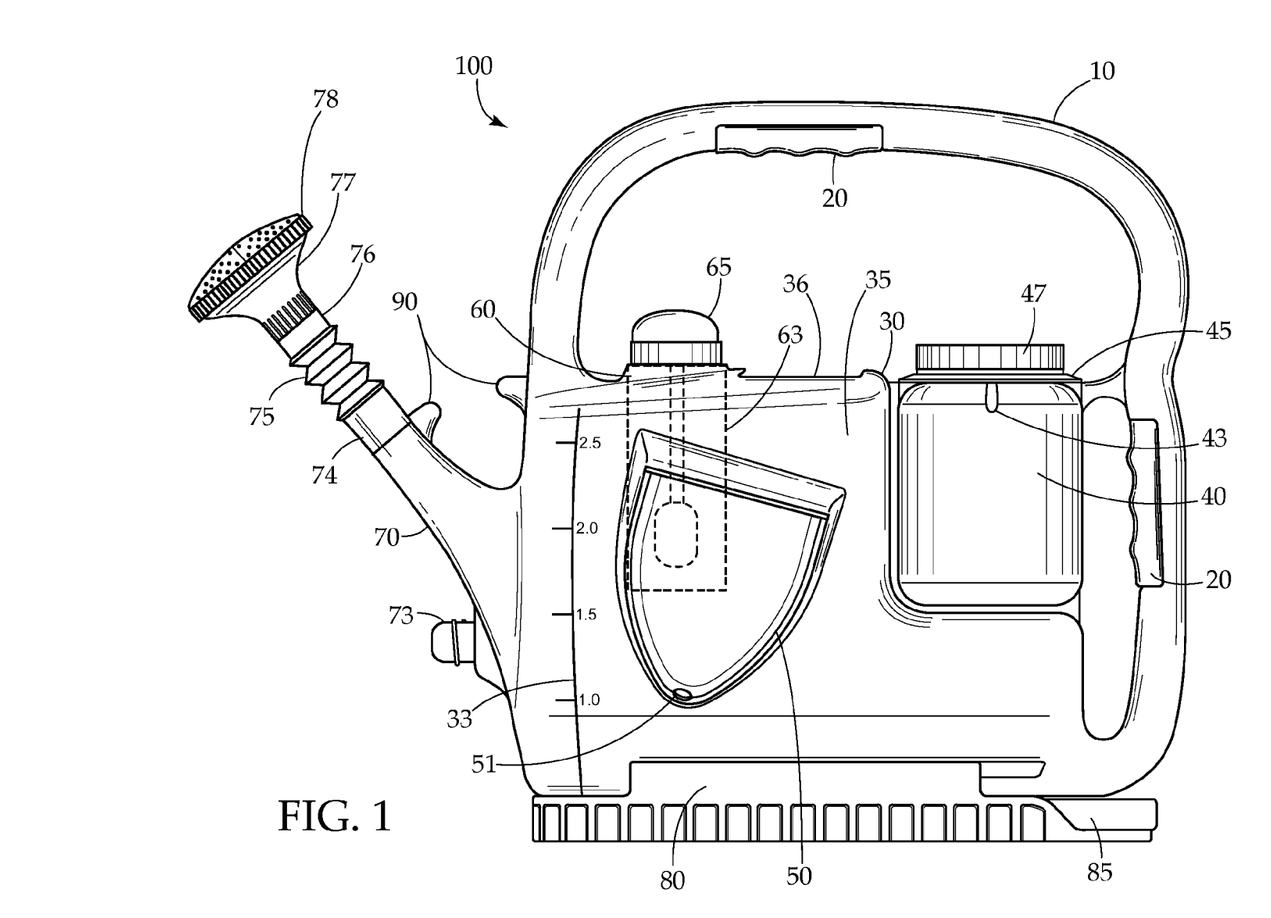
FIG. 1 illustrates a first side view of the improved liquid containing and dispersing apparatus and various features of this embodiment of said apparatus when viewed with the bellowed nozzle pointing to the left.
Figure 2:
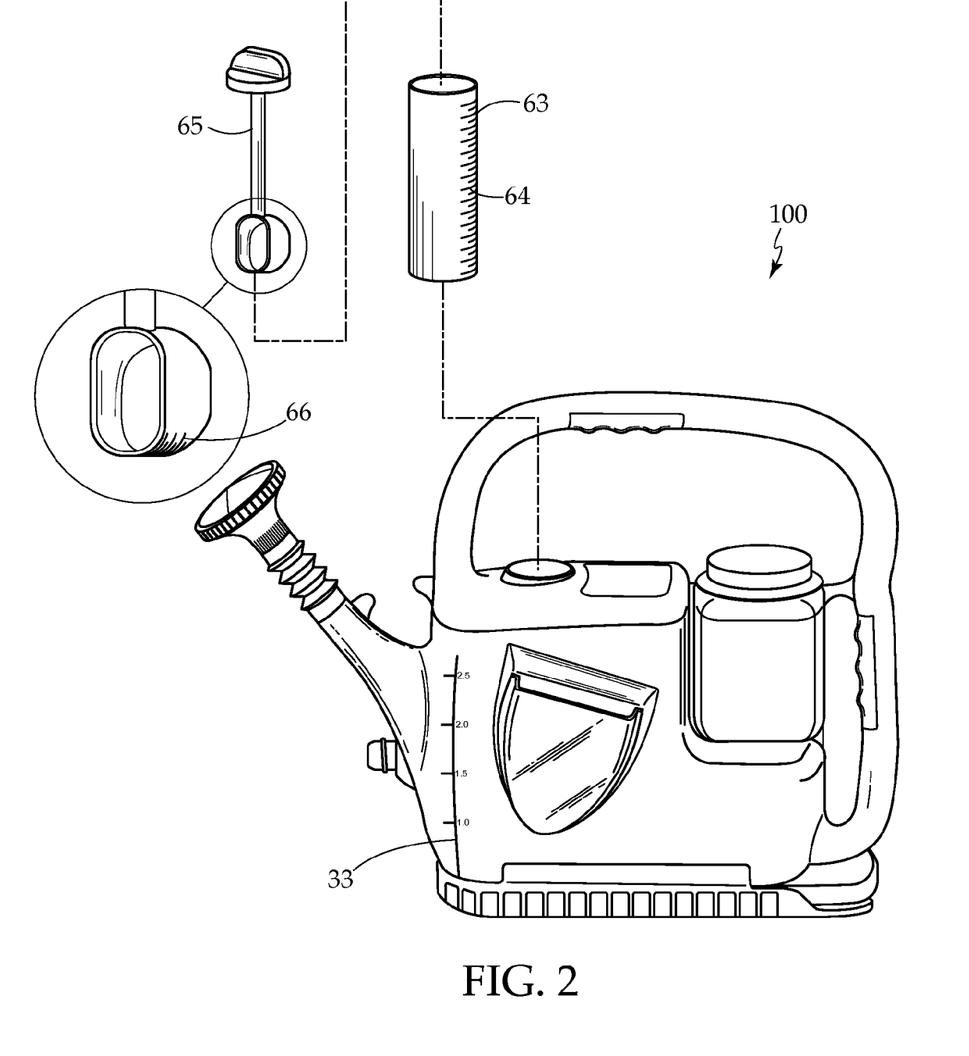
FIG. 2 illustrates a first side view of the improved liquid containing and dispersing apparatus and various features including a measuring tube and a measuring implement, wherein both removably attach and substantially rest within the main storage chamber and, wherein said measuring implement rests within said measuring tube.
Figure 3:
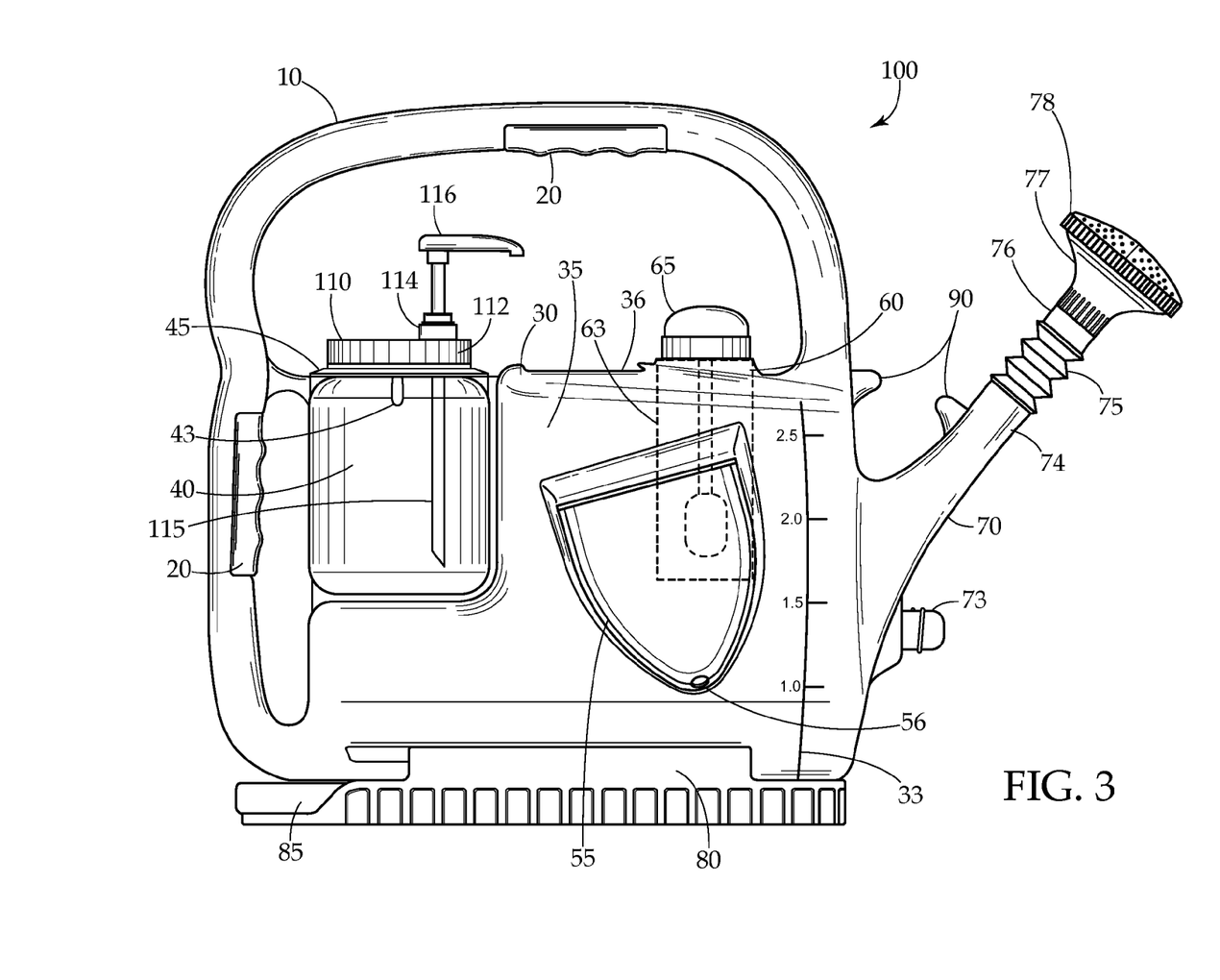
FIG. 3 illustrates a second side view of the improved liquid containing and dispersing apparatus, wherein the embodiment illustrated herein displays a fluid retaining chamber, a mass storage chamber, an internal view of a measuring tube, and a bellowed nozzle pointing to the left.

FIGS. 1, 2 and 3 commonly illustrate side views of the instant invention. The portable liquid containing and dispersing apparatus 100 is illustrated as comprising a substantially transparent housing 30, a primary storage chamber 35 (primarily for liquids), a secondary storage chamber 40 (for containing liquid fertilizers and solid water-soluble or other solid fertilizers), a gripping member 10 (preferably comprising at least one manual gripping member 20 with a sponge like and/or rubber like exterior) and a water passage member 70. Further, comprising the portable liquid containing and dispersing apparatus are side instrument or accessory storage chambers 50, 55 contiguously and seamlessly attached to said primary storage chamber 35, wherein matter enters said primary liquid storage chamber 35 through a passage cavity 36. Additionally illustrated is a bottom accessory storage chamber 85 either contiguously and seamlessly attached to said primary liquid retaining chamber 35 or removably attached to said primary liquid retaining chamber 35 (illustrated in FIGS. 1 and 3 as containing a working surface cushioning member 85). In addition, the side instrument or accessory storage chambers 50, 55 further comprise at least one cavity 51, 56 for solid and liquid matter drainage.

The secondary liquid-or-solid mass storage chamber 40, as depicted in FIGS. 1 and 43 indicator 2, and 3, is externally contiguously connected to said primary storage chamber 35, while internally is separated by at least one wall member. Further comprising the secondary liquid-or-solid mass storage chamber 40 (as displayed in FIGS. 1 and 2) is a removably attached lid member 47 and a manually operated usage reminder dial 45.

Further displayed in FIGS. 1, 2 and 3 is the water passage member 70 comprising a removably attached bendable and collapsible "bellowed" section 75, a bellows mounting section 74 (that may or may not be threaded), a removably attached head unit 77, a threaded head mounting section 76 and a top head section 78 comprising a plurality of open cavity members through which liquids may pass. Also attached to said water passage member 70 is a docking station 73, wherein said head unit 77 may removably attach to said docking station 73 (such a configuration being advantageous when the top head section water disbursing properties are not desirable). Additionally illustrated in these FIGS. 1, 2 and 3 are two holding members 90, wherein one holding member is permanently attached to said water passage member 70 and the other holding member 90 is permanently attached to said primary liquid storage chamber 35. The holding members function so that a flexible bendable material is passed through the cavity between said holding members 90, the water passage member 70 and the primary storage chamber 35 (wherein successful flexible bendable materials comprise textiles such as gloves or towels).

Internally illustrated in FIGS. 1 and 3 and disassembled illustrated in FIG. 2 are a substantially cylindrical matter measuring tube 63, resting within a measuring implements cavity 60 and a mass measuring implement 65, wherein said mass measuring implement 65 comprises a substantially shallow cavity at one end and an attached threaded lid member at a second end and, wherein said shallow cavity contains a specifically determined amount of mass. As shown in FIG. 2, the mass measuring implement 65 removably and attachedly rests within said matter measuring tube 63 and said matter measuring tube 63 removably rest within said primary storage chamber 35. Additionally, said measuring tube 63 and said shallow cavity further comprise a plurality of mass measuring markers 64, 66.

FIG. 3 separately illustrates an embodiment of the instant invention, wherein the lid to said secondary mass storage chamber 40 comprises a manual liquid extraction assembly 110. This manual liquid extraction assembly further comprises a liquid passage tube 115 that passes through a lid member 112 and is securely held in place by a removably attached tube holding member 114 and a liquid assembly head member 116.

Figure 4:
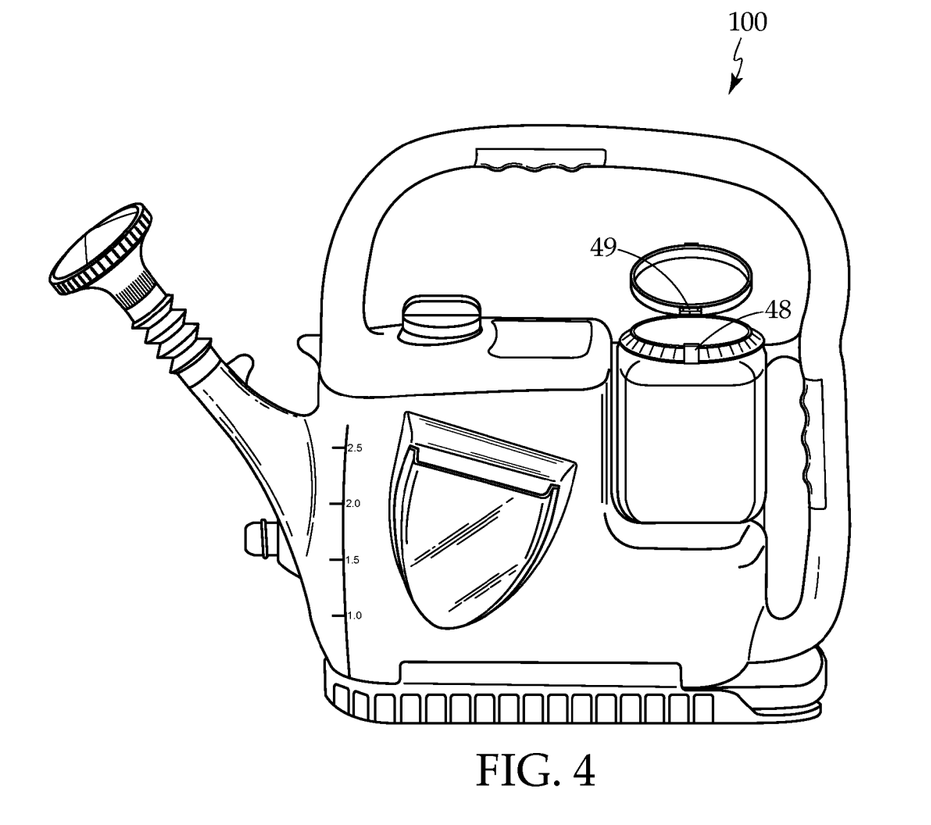
FIG. 4 illustrates a first side view of the improved liquid containing and dispersing apparatus, wherein the embodiment illustrated further displays the secondary storage chamber comprising a hingedly attached sealing member and a clasping member to hold said hingedly attached sealing member to said secondary storage chamber.
Figure 5:
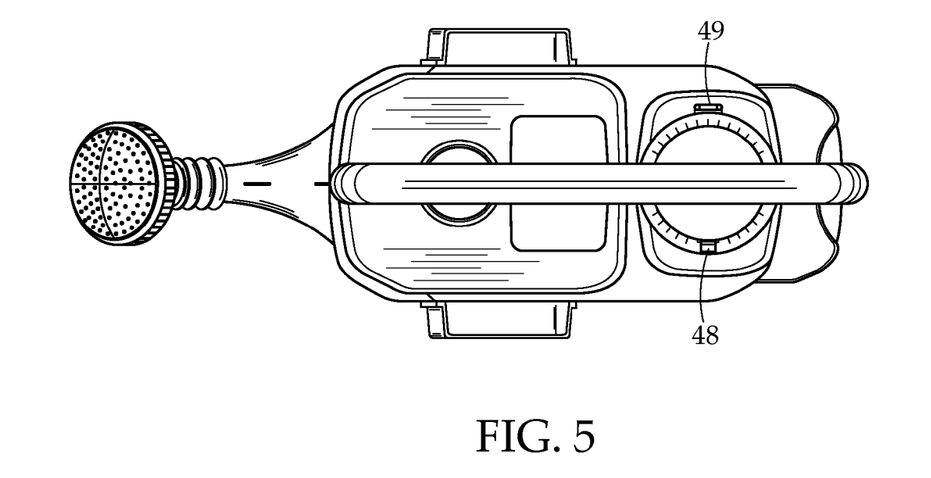
FIG. 5 illustrates a top-down view of the improved liquid containing and dispersing apparatus, wherein the embodiment illustrated further displays the secondary storage chamber comprising a hingedly attached sealing member and a clasping member to hold said hingedly attached sealing member to said secondary storage chamber.
Figure 6:
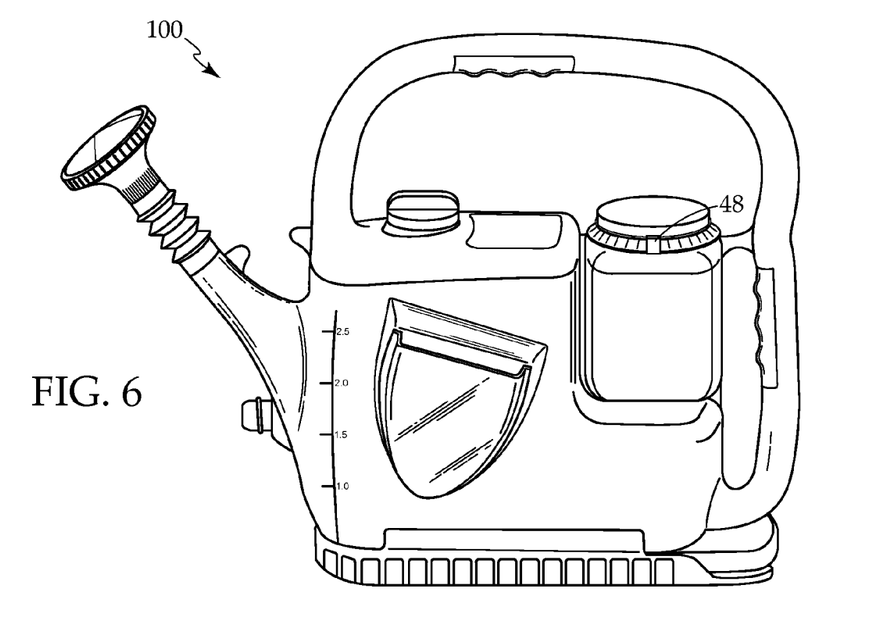
FIG. 6 illustrates a first side view of the improved liquid containing and dispersing apparatus, wherein the embodiment illustrated further displays the secondary storage chamber comprising a removably attached sealing member, wherein said sealing member is removably attached to said secondary storage chamber by at least one clasping member.
Figure 7:
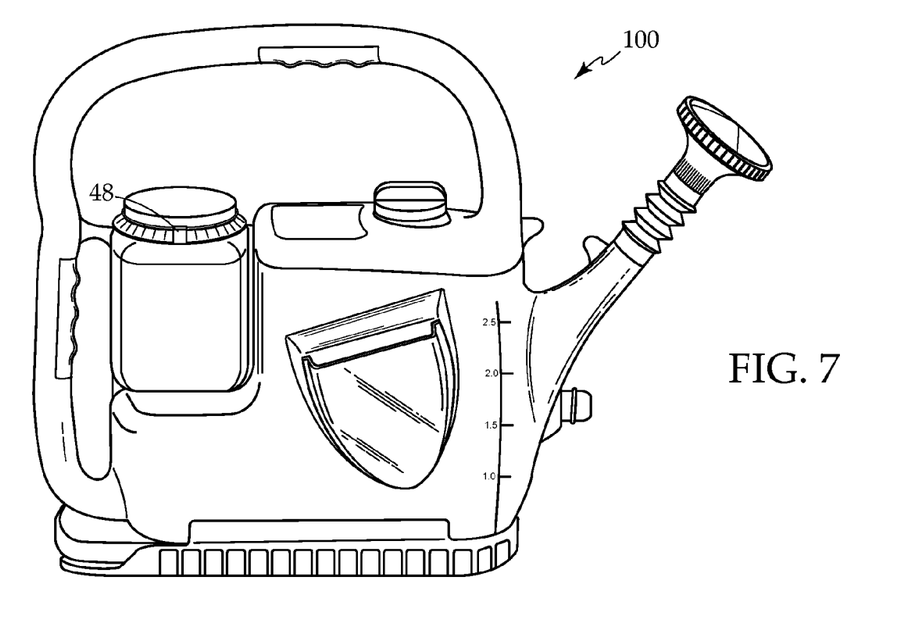
FIG. 7 illustrates a second side view of the improved liquid containing and dispersing apparatus, wherein the embodiment illustrated further displays the secondary storage chamber comprising a removably attached sealing member, wherein said sealing member is removably attached to said secondary storage chamber by at least one clasping member.
Figure 8:
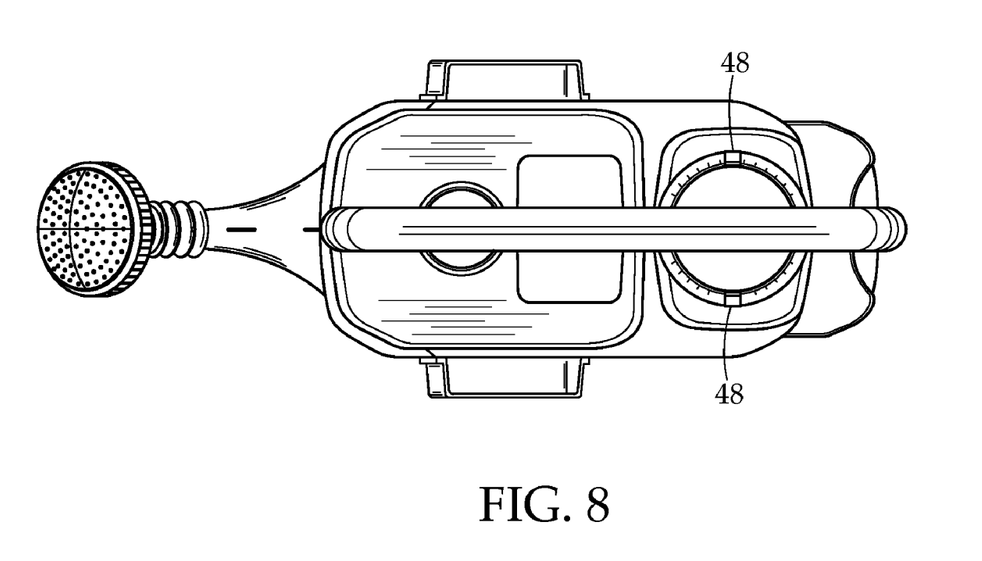
FIG. 8 illustrates a top-down view of the improved liquid containing and dispersing apparatus, wherein the embodiment illustrated further displays the secondary storage chamber comprising a removably attached sealing member, wherein said sealing member is removably attached to said secondary storage chamber by at least one clasping member.

FIGS. 4-8 illustrate various embodiments of the instant invention, wherein different variations of sealing mechanisms for the secondary storage chamber 40 are illustrated. FIGS. 4 and 5 illustrate a hindgedly attached lid sealing system comprising a hinge member 49 and at least one clasp member 48. FIGS. 5-8 illustrate a clasp sealing system, wherein at least one (but preferably at least two) clasp member(s) 48 are used to hold down the sealing member 47.

The invention is intended to be a virtual all-in-one gardening tool and not simply as a means to transport and distribute water, fertilizer and other supplements that assist in gardening.

The intention is that the invention allows for a user to substantially avoid the need to return to a storage area for additional gardening tools and supplies, thus saving time and effort. Thus the invention supports a type of carry-it-all system. The primary chamber 35 would generally be dedicated to holding water, water-fertilizer mixes, or water-supplement mixes. The secondary chamber 40 is, in one embodiment, designed with the intention of holding substantially solid fertilizers and/or supplements, thus preventing the need to return to where the fertilizers and/or supplements are stored. In a second embodiment the secondary storage chamber 40 is intended to hold substantially liquid or fluid fertilizers and/or supplements and features a depressible liquid extraction assembly 110 for obtaining an amount of liquid or fluid fertilizer/supplement. It should be noted that the secondary storage chamber 40 is intended to be compatible with various types of solid mass fertilizers and supplements, such as powders, tablets and other preshaped solid forms. Further, the secondary storage chamber 40 is intended to be compatible with premeasured units of solid mass fertilizers and supplements that are individually packaged.

The secondary storage chamber comprises several embodiments allowing for different means of securing the securing member 47 (type of lid) to itself. These comprise a hinged embodiment in which the securing member 47 is hingedly attached to the body of the secondary storage chamber 40. Another embodiment is where the securing member 47 is removeably attached to the secondary storage chamber 40 by at least one clasp member 48 that is attached to a ring placed about said secondary storage chamber 40. In another embodiment the securing member 47 is held in place by threads on the internal rim of said securing member and threads about the rim of the secondary storage chamber 40.

When removing an amount of solid fertilizer from the secondary storage chamber 40 a user utilizes the inventions spoon shaped measuring implement (spoon) 65 that is designed to rest in a cavity about the primary storage chamber 35. In some embodiments of the instant invention this spoon 65 rests within a 'measuring tube' (tube) 63 and this tube 63 rests within a cavity about the primary storage chamber 35 (preventing the spoon from contacting any contained within the primary storage chamber). The amount of mass the spoon shaped end of this measuring implement 65 is of a predetermined volume, allowing a user to know without careful measurement the amount of solid fertilizer they are adding to the primary storage chamber 35. Additionally, the spoon 65 comprises indicia 66 about the spoon shaped end that can be used to measure finer amounts of mass. A significant advantage provided by the spoon 65 is that it comprises a guard member at one end. When a user grips the spoon 65 by the guard end and extract amounts of solid fertilizer and/or supplements the guard substantially aids to prevent direct contact with the solid fertilizers and/or supplements, thus protecting the user from possible contact with harmful chemicals that can damage and/or stain surfaces it contacts (human tissue, clothing etc.).

When removing liquid fertilizers and/or supplements from said secondary storage chamber 40, the user uses the liquid extraction assembly 110 to extract liquid into the spoon 65 or the tube 63. Further, other embodiments allow for some direct extraction of the liquid fertilizers and/or supplements directly into the primary storage chamber 35 (in instances when exact measurements for the number of units of fertilizer and/or supplements need be added).

After removing an amount of mass (solid, liquid or other) from the secondary storage chamber 40, the amount can be added to the primary storage chamber 35 and then mixed with the contents of the primary storage chamber 35 (by shaking or mixing with a mixing implement). Also, upon removing an amount of mass from the secondary storage chamber 40 a user may mark the moment of last use of the fertilizer along a date/time marking means 45 (a date dial 45 in most instances). Again, this feature prevents the need to carry other means of recording the time when fertilizer was last used and/or returning to another area to record this information. Thus, this feature of the instant invention again facilitates its carry-it-all system to save users time and effort.

The tube 63 is intended for measuring larger amounts of mass as compared to the spoon 65 and comprises indicia 66 about it to allow for the measuring of finer amounts of mass.

In further developing the carry-it-all system the invention seeks to support, at least one article carrying member 50 is attached to the device about its exterior. These carrying member(s) 50 support the carrying of tools with the device, thus again substantially reducing the need to go back to a storage area for tools, or to carry additional bags or packs in order to carry these tools. In addition, these article carrying members 50 comprise their own drainage cavity 51, allowing fluids and smaller solid pieces of matter to pass through the bottom of these article carrying members 50.

Also facilitating the carry-it-all system is a bottom chamber 80 designed with the intension to carry a personal cushion 85 (typically to be used as a knee pad). Again, as this personal cushion 85 is carried with the instant device 100 the need to return to a storage area is again mitigated by this feature.

Additionally, the carry-it-all system comprises an accessory holding means by providing a plurality of protruding members 90 about the base of the nozzle of the instant device with opposing protruding members 90 substantially located across from base of the nozzle 70. The above mentioned positioning of these protruding members 90 are such that a substantially open passage is formed, through which articles may be forced to pass through. For instance, gloves may be placed though the substantially open passage until they are taught relative to the nozzle 70 one wall of the primary storage chamber 30 and the protruding members 90.

To assist in carrying and using the device 100 in situations when the head unit 77 is not desirable the unit provides a means of carrying the head unit 77 by removably attaching it to the docking station 73. This feature prevents the possible need to place the head unit 77 in either another pouch or to carry it to a storage area, thus again facilitating the inventions carry-it-all system.

What is claimed is:

1. A fluid containing and dispersing apparatus comprising:
a primary liquid containment chamber;
    a fluid dispersing member in fluid communication with said primary liquid containment chamber;
    a gripping member attached to the primary liquid containment chamber;
    a secondary mass storage chamber attached to said primary liquid containment chamber, said secondary mass storage chamber being permanently attached to said primary liquid containment chamber;
    a cavity formed by an exterior of said primary liquid containment chamber;
    a substantially cylindrical tube removably positioned within said cavity, a plurality of mass measuring markers disposed on a surface of said tube;
    a spoon removably positioned within said tube, said tube separating said spoon from an interior of said primary liquid containment chamber, said spoon being attachable to said primary liquid containment chamber, the tube being secured within said cavity when attached to said primary liquid containment chamber, said spoon having a shaft, a cupped first end at a proximal end of said shaft, and a guard member formed on a distal end of said shaft, said guard member attaching said spoon to said primary liquid containment chamber and sealing said cavity; and
    a date dial positioned on said secondary mass storage chamber, said date dial being rotatable, and being configured to mark a date of a last use of said fluid containing and dispersing apparatus.

2. A method of transporting and distributing fluids, wherein said method comprises:

placing water into a fluid containment chamber, wherein a fluid containing and dispersing apparatus comprises said fluid containment chamber and a mass storage chamber placing an amount of solid fertilizer in said mass storage chamber;

removing a measuring spoon from a cavity formed by said fluid containment chamber;

measuring a mass of said fertilizer by removing said fertilizer using measuring spoon, wherein said measuring spoon comprises a guard member and wherein said measuring spoon is removably attached to said fluid containing and dispersing apparatus;

placing said measured fertilizer in said fluid containment chamber;

mixing and dissolving said fertilizer with said water in said fluid containment chamber, wherein the step of mixing and dissolving of said fertilizer and said water produces a mixture;

placing said measuring spoon within a measuring tube;

placing said measuring tube into said cavity, wherein said measuring spoon is protected from said fluid placed within said one containment chamber by said measuring tube;

securing said measuring spoon and said measuring tube to said fluid containing and dispersing apparatus; and marking a date of administration of said mixture using a date dial attached to said fluid containing and dispersing apparatus.

3. The method of transporting and distributing fluids of claim 2, wherein said step of measuring the mass of said fertilizer further comprises a step of removing a number of premeasured units of fertilizer from said amount of fertilizer in said mass storage chamber.

* * * * *